(12) United States Patent
Asher et al.

(10) Patent No.: US 7,811,172 B2
(45) Date of Patent: Oct. 12, 2010

(54) SYSTEM AND METHOD FOR WIRELESS LOTTERY

(75) Inventors: Joseph M. Asher, New York, NY (US); Robert F. Bahrampour, New York, NY (US)

(73) Assignee: CFPH, LLC, New York, NY (US)

( * ) Notice: Subject to any disclaimer, the term of this patent is extended or adjusted under 35 U.S.C. 154(b) by 1179 days.

(21) Appl. No.: 11/256,568

(22) Filed: Oct. 21, 2005

(65) Prior Publication Data
US 2007/0093296 A1    Apr. 26, 2007

(51) Int. Cl.
A63F 9/24 (2006.01)
A63F 13/00 (2006.01)
G06F 17/00 (2006.01)
G06F 19/00 (2006.01)

(52) U.S. Cl. .......................... 463/42; 463/17; 463/39; 705/30; 705/40; 705/44

(58) Field of Classification Search .................. 463/42
See application file for complete search history.

(56) References Cited

U.S. PATENT DOCUMENTS

| | | | |
|---|---|---|---|
| 3,580,581 A | 5/1971 | Raven | 273/138 A |
| 3,838,259 A | 9/1974 | Kortenhaus | 235/152 |
| 3,876,208 A | 4/1975 | Wächtler et al. | 273/138 A |
| 3,929,338 A | 12/1975 | Busch | 273/138 |
| 4,101,129 A | 7/1978 | Cox | 273/143 R |
| 4,157,829 A | 6/1979 | Goldman et al. | 273/138 A |
| 4,206,920 A | 6/1980 | Weatherford et al. | 273/138 A |
| 4,216,965 A | 8/1980 | Morrison et al. | 273/237 |
| 4,238,127 A | 12/1980 | Lucero et al. | 273/143 R |
| 4,240,635 A | 12/1980 | Brown | 273/138 A |
| 4,266,214 A | 5/1981 | Peters, Jr. | 340/323 R |
| 4,335,809 A | 6/1982 | Wain | 194/1 R |
| 4,448,419 A | 5/1984 | Telnaes | 273/143 R |
| 4,467,424 A | 8/1984 | Hedges et al. | 364/412 |
| 4,492,379 A | 1/1985 | Okada | 273/143 R |

(Continued)

FOREIGN PATENT DOCUMENTS

DE    31 29 550 A1    4/1982

(Continued)

OTHER PUBLICATIONS

PCT Notification of Transmittal of the International Search Report and the Written Opinion of the International Searching Authority, or the Declaration with attached PCT International Search Report and Written Opinion of the International Searching Authority in International Application No. PCT/US06/26600 filed Jul. 7, 2006 (8 pages), mailed Jan. 19, 2007.

(Continued)

*Primary Examiner*—John M. Hotaling, II
*Assistant Examiner*—Paul A. D'Agostino
(74) *Attorney, Agent, or Firm*—Thomas D. Bradshaw

(57) ABSTRACT

A lottery system is provided. Lottery tickets may be purchased using a communication device, such as a mobile device. Sales commissions, or other credit, for the purchased tickets may be determined for one or more retailers based at least partially on the location of the communication device, for example, when the purchase is made.

49 Claims, 1 Drawing Sheet

U.S. PATENT DOCUMENTS

| | | | |
|---|---|---|---|
| 4,527,798 A | 7/1985 | Siekierski et al. | 273/86 R |
| 4,572,509 A | 2/1986 | Sitrick | 273/85 G |
| 4,573,681 A | 3/1986 | Okada | 273/143 R |
| 4,614,342 A | 9/1986 | Takashima | 273/85 CP |
| 4,624,459 A | 11/1986 | Kaufman | 273/143 R |
| 4,636,951 A | 1/1987 | Harlick | 364/412 |
| 4,648,600 A | 3/1987 | Olliges | 273/138 A |
| 4,652,998 A | 3/1987 | Koza et al. | 364/412 |
| 4,692,863 A | 9/1987 | Moosz | 364/412 |
| 4,760,527 A | 7/1988 | Sidley | 364/412 |
| 4,805,907 A | 2/1989 | Hagiwara | 273/138 A |
| 4,817,951 A | 4/1989 | Crouch et al. | 273/143 R |
| 4,838,552 A | 6/1989 | Hagiwara | 273/138 A |
| 4,853,884 A | 8/1989 | Brown et al. | 364/602 |
| 4,856,787 A | 8/1989 | Itkis | 273/237 |
| 4,858,932 A | 8/1989 | Keane | 273/143 R |
| 4,860,929 A | 8/1989 | Lowe et al. | |
| 4,880,237 A | 11/1989 | Kishishita | 273/138 A |
| 4,909,516 A | 3/1990 | Kolinsky | 273/237 |
| 4,921,713 A | 5/1990 | Fowler | |
| 4,926,327 A | 5/1990 | Sidley | 364/412 |
| 4,959,783 A | 9/1990 | Scott et al. | 364/412 |
| 4,964,638 A | 10/1990 | Ishida | 273/138 A |
| 4,986,451 A | 1/1991 | Lowe et al. | |
| 5,007,087 A | 4/1991 | Bernstein et al. | 380/46 |
| 5,024,441 A | 6/1991 | Rousseau | 273/176 R |
| 5,048,833 A | 9/1991 | Lamle | 273/138 A |
| 5,050,881 A | 9/1991 | Nagao | 273/143 R |
| 5,052,553 A | 10/1991 | De Santis | |
| 5,074,559 A | 12/1991 | Okada | 273/143 R |
| 5,083,785 A | 1/1992 | Okada | 273/143 R |
| 5,094,861 A | 3/1992 | Aususte et al. | |
| 5,096,195 A | 3/1992 | Gimmon | 273/138 A |
| 5,096,202 A | 3/1992 | Hesland | 273/237 |
| 5,102,134 A | 4/1992 | Smyth | 273/138 A |
| 5,125,534 A | 6/1992 | Rose et al. | |
| 5,229,764 A | 7/1993 | Matchett et al. | |
| 5,242,163 A | 9/1993 | Fulton | 273/85 CP |
| 5,251,165 A | 10/1993 | James, III | 364/717 |
| 5,251,898 A | 10/1993 | Dickenson et al. | 273/143 R |
| 5,263,716 A | 11/1993 | Smyth | 273/138 A |
| 5,280,426 A | 1/1994 | Edmonds | 364/408 |
| 5,280,909 A | 1/1994 | Tracy | 273/138 A |
| 5,324,035 A | 6/1994 | Morris et al. | 273/138 A |
| 5,326,104 A | 7/1994 | Pease et al. | 273/138 A |
| 5,344,199 A | 9/1994 | Carstens et al. | 273/138 A |
| 5,351,970 A | 10/1994 | Fioretti | 273/439 |
| 5,370,306 A | 12/1994 | Schulze et al. | 273/138 A |
| 5,380,007 A | 1/1995 | Travis et al. | 273/138 A |
| 5,380,008 A | 1/1995 | Mathis et al. | 273/143 R |
| 5,393,061 A | 2/1995 | Manship et al. | 273/143 R |
| 5,398,932 A | 3/1995 | Eberhardt et al. | 273/138 A |
| 5,415,416 A | 5/1995 | Scagnelli et al. | 273/439 |
| 5,421,576 A | 6/1995 | Yamazaki et al. | 273/138 A |
| 5,429,361 A | 7/1995 | Raven et al. | 273/138 A |
| 5,476,259 A | 12/1995 | Weingardt | 273/85 CP |
| 5,505,449 A | 4/1996 | Eberhardt et al. | 273/138 A |
| 5,507,485 A | 4/1996 | Fisher | 273/32 R |
| 5,511,784 A | 4/1996 | Furry et al. | 273/143 R |
| 5,524,888 A | 6/1996 | Heidel | 463/22 |
| 5,551,692 A | 9/1996 | Pettit et al. | 273/143 R |
| 5,569,083 A | 10/1996 | Fioretti | 463/19 |
| 5,569,084 A | 10/1996 | Nicastro et al. | 463/20 |
| 5,580,309 A | 12/1996 | Piechowiak et al. | 463/16 |
| 5,586,937 A | 12/1996 | Menashe | 463/41 |
| 5,588,913 A | 12/1996 | Hecht | 463/19 |
| 5,613,912 A | 3/1997 | Slater | 463/25 |
| 5,653,634 A | 8/1997 | Hodges | 463/1 |
| 5,654,746 A | 8/1997 | McMullan, Jr. et al. | 348/6 |
| 5,655,961 A | 8/1997 | Acres et al. | 463/27 |
| 5,675,828 A | 10/1997 | Stoel et al. | 395/825 |
| 5,697,844 A | 12/1997 | Von Kohorn | 463/40 |
| 5,702,302 A | 12/1997 | Gauselmann | 463/20 |
| 5,707,286 A | 1/1998 | Carlson | 463/16 |
| 5,711,420 A | 1/1998 | Spring | |
| 5,738,583 A | 4/1998 | Comas et al. | 463/40 |
| 5,768,382 A | 6/1998 | Schneier et al. | |
| 5,785,595 A | 7/1998 | Gauselmann | 463/20 |
| 5,816,920 A | 10/1998 | Hanai | 463/42 |
| 5,836,817 A | 11/1998 | Acres et al. | 463/26 |
| 5,857,911 A | 1/1999 | Fioretti | 463/40 |
| 5,904,619 A | 5/1999 | Scagnelli et al. | 463/17 |
| 5,904,620 A | 5/1999 | Kujawa | 463/41 |
| 5,910,047 A | 6/1999 | Scagnelli et al. | 463/17 |
| 5,921,865 A | 7/1999 | Scagnelli et al. | 463/17 |
| 5,934,493 A | 8/1999 | Han | |
| 5,935,005 A | 8/1999 | Tsuda et al. | 463/41 |
| 5,959,596 A | 9/1999 | McCarten et al. | 345/2 |
| 5,970,143 A | 10/1999 | Schneier et al. | |
| 5,999,808 A | 12/1999 | LaDue | 455/412 |
| 6,003,013 A | 12/1999 | Boushy et al. | |
| 6,012,982 A | 1/2000 | Piechowiak et al. | 463/16 |
| 6,050,622 A | 4/2000 | Gustafson | |
| 6,100,804 A | 8/2000 | Brady et al. | |
| 6,104,815 A | 8/2000 | Alcorn | 380/251 |
| 6,109,538 A | 8/2000 | Villani et al. | |
| 6,146,270 A | 11/2000 | Huard et al. | 463/12 |
| 6,210,274 B1 | 4/2001 | Carlson | 463/16 |
| 6,233,448 B1 | 5/2001 | Alperovich et al. | 455/417 |
| 6,248,017 B1 | 6/2001 | Roach | 463/37 |
| 6,251,017 B1 | 6/2001 | Leason et al. | |
| 6,272,223 B1 | 8/2001 | Carlson | 380/251 |
| 6,277,026 B1 | 8/2001 | Archer | 463/42 |
| 6,277,029 B1 | 8/2001 | Hanley | 473/131 |
| 6,287,202 B1 | 9/2001 | Pascal et al. | 463/42 |
| 6,290,601 B1 | 9/2001 | Yamazaki et al. | 463/22 |
| RE37,414 E | 10/2001 | Harlick | 463/42 |
| 6,386,976 B1 | 5/2002 | Yamazaki et al. | 463/22 |
| 6,409,602 B1 | 6/2002 | Wiltshire et al. | |
| 6,425,828 B2 | 7/2002 | Walker et al. | |
| 6,428,413 B1 | 8/2002 | Carlson | 463/16 |
| RE37,885 E | 10/2002 | Acres et al. | 463/42 |
| 6,468,155 B1 | 10/2002 | Zucker | 463/23 |
| 6,508,710 B1 | 1/2003 | Paravia et al. | 463/42 |
| 6,509,217 B1 | 1/2003 | Reddy | |
| 6,524,189 B1 | 2/2003 | Rautila | 463/40 |
| 6,527,641 B1 | 3/2003 | Sinclair et al. | 463/39 |
| 6,542,750 B2 | 4/2003 | Hendrey et al. | 455/456 |
| 6,554,707 B1 | 4/2003 | Sinclair | 463/39 |
| 6,556,819 B2 | 4/2003 | Irvin | 455/410 |
| 6,575,834 B1 | 6/2003 | Lindo | 463/40 |
| 6,577,733 B1 | 6/2003 | Charrin | |
| 6,582,302 B2 | 6/2003 | Romero | 463/12 |
| 6,585,597 B2 | 7/2003 | Finn | 463/40 |
| 6,614,350 B1 | 9/2003 | Lunsford | 340/572.1 |
| 6,618,706 B1 | 9/2003 | Rive et al. | 705/30 |
| 6,628,939 B2 | 9/2003 | Paulsen | 455/414 |
| 6,634,942 B2 | 10/2003 | Walker | 463/20 |
| 6,676,522 B2 | 1/2004 | Rowe | 463/42 |
| 6,682,421 B1 | 1/2004 | Rowe et al. | 463/25 |
| 6,709,333 B1 | 3/2004 | Bradford et al. | |
| 0,669,296 A1 | 4/2004 | Atherton | |
| 6,719,631 B1 | 4/2004 | Tulley et al. | 463/17 |
| 6,729,956 B2 | 5/2004 | Wolf et al. | 463/25 |
| 6,745,011 B1 | 6/2004 | Hendrickson | 455/67.11 |
| 6,749,505 B1 | 6/2004 | Kunzle | 463/30 |
| 6,754,210 B1 | 6/2004 | Ofek | 370/389 |
| 6,755,742 B1 | 6/2004 | Hartman | 463/40 |
| 6,756,882 B2 | 6/2004 | Benes | 340/323 |
| 6,773,350 B2 | 8/2004 | Yoshimi et al. | 463/42 |
| 6,778,820 B2 | 8/2004 | Tendler | 455/414.2 |
| 6,793,580 B2 | 9/2004 | Sinclair | 463/39 |
| 6,800,031 B2 | 10/2004 | Di Cesare | 463/40 |
| 6,802,772 B1 | 10/2004 | Kunzle | 463/2 |

| | | | | | |
|---|---|---|---|---|---|
| 6,837,789 B2 | 1/2005 | Garahi et al. ............... 463/29 | 2003/0064712 A1 | 4/2003 | Gaston ...................... 455/414 |
| 6,843,412 B1 | 1/2005 | Sanford ..................... 235/379 | 2003/0064805 A1 | 4/2003 | Wells ......................... 463/39 |
| 6,843,725 B2 | 1/2005 | Nelson ....................... 463/40 | 2003/0064807 A1 | 4/2003 | Walker et al. ............... 463/42 |
| 6,846,238 B2 | 1/2005 | Wells ......................... 463/39 | 2003/0069940 A1 | 4/2003 | Kavacheri et al. ........... 709/217 |
| 6,863,610 B2 | 3/2005 | Vancraeynest ............... 463/41 | 2003/0078101 A1 | 4/2003 | Schneider et al. ........... 463/42 |
| 6,868,396 B2 | 3/2005 | Smith et al. .................. 705/27 | 2003/0087701 A1 | 5/2003 | Paravia et al. ............... 463/42 |
| 6,884,162 B2 | 4/2005 | Raverdy ....................... 463/1 | 2003/0109306 A1 | 6/2003 | Karmarkar .................. 463/40 |
| 6,893,347 B1 | 5/2005 | Zilliacus ..................... 463/41 | 2003/0114218 A1 | 6/2003 | McClintic .................... 463/25 |
| 6,896,618 B2 | 5/2005 | Benoy et al. ................. 463/25 | 2003/0130032 A1 | 7/2003 | Martinek et al. |
| 6,898,299 B1 | 5/2005 | Brooks | 2003/0139190 A1 | 7/2003 | Steelberg .................... 455/456 |
| 6,899,628 B2 | 5/2005 | Leen et al. ................... 463/42 | 2003/0140131 A1 | 7/2003 | Chandrashekhar ......... 709/223 |
| 6,908,387 B2 | 6/2005 | Hedrick et al. | 2003/0148809 A1 | 8/2003 | Nelson |
| 6,935,952 B2 | 8/2005 | Walker et al. ............... 463/25 | 2003/0148812 A1 | 8/2003 | Paulsen et al. ............... 463/42 |
| 6,935,958 B2 | 8/2005 | Nelson | 2003/0157976 A1 | 8/2003 | Simon ........................... 463/1 |
| RE38,812 E | 10/2005 | Acres et al. .................. 463/26 | 2003/0162580 A1 | 8/2003 | Cousineau et al. ........... 463/17 |
| 6,986,055 B2 | 1/2006 | Carlson ....................... 713/200 | 2003/0162593 A1 | 8/2003 | Griswold |
| 6,997,810 B2 | 2/2006 | Cole | 2003/0173408 A1 | 9/2003 | Mosher et al. |
| 7,022,017 B1 | 4/2006 | Halbritter et al. ............ 463/42 | 2003/0176162 A1 | 9/2003 | Planki et al. ................ 455/3.01 |
| 7,033,276 B2 | 4/2006 | Walker et al. ............... 463/40 | 2003/0176218 A1 | 9/2003 | LeMay ......................... 463/25 |
| 7,035,653 B2 | 4/2006 | Simon et al. ................. 455/466 | 2003/0177187 A1 | 9/2003 | Levine et al. |
| 7,040,987 B2 | 5/2006 | Walker et al. ............... 463/42 | 2003/0195037 A1 | 10/2003 | Vuong et al. |
| 7,042,360 B2 | 5/2006 | Light et al. | 2003/0195043 A1 | 10/2003 | Shinners et al. |
| 7,043,641 B1 | 5/2006 | Martinek et al. | 2003/0212996 A1* | 11/2003 | Wolzien ........................ 725/60 |
| 7,097,562 B2 | 8/2006 | Gagner ......................... 463/42 | 2003/0228895 A1 | 12/2003 | Edelson ......................... 463/1 |
| 7,102,509 B1 | 9/2006 | Anders et al. | 2003/0228907 A1 | 12/2003 | Gatto et al. ................... 463/42 |
| 7,124,947 B2 | 10/2006 | Storch | 2003/0228910 A1 | 12/2003 | Jawaharlal et al. ............ 463/42 |
| 7,125,334 B2 | 10/2006 | Yamazaki et al. ........... 463/22 | 2003/0236120 A1 | 12/2003 | Reece ........................... 463/42 |
| 7,147,558 B2 | 12/2006 | Giobbi ......................... 463/25 | 2004/0002355 A1 | 1/2004 | Spencer, II .................. 455/550 |
| 7,158,798 B2 | 1/2007 | Lee et al. ..................... 455/456.3 | 2004/0002383 A1 | 1/2004 | Lundy .......................... 463/42 |
| 7,229,354 B2 | 6/2007 | McNutt et al. ............... 463/29 | 2004/0002386 A1 | 1/2004 | Wolfe et al. .................. 463/42 |
| 7,270,605 B2 | 9/2007 | Russell et al. ................ 463/40 | 2004/0002843 A1 | 1/2004 | Robarts ........................ 703/13 |
| 7,316,619 B2 | 1/2008 | Nelson | 2004/0029635 A1 | 2/2004 | Giobbi ........................ 463/30 |
| 2001/0018663 A1 | 8/2001 | Dussell et al. ................. 705/9 | 2004/0034775 A1 | 2/2004 | Desjardins et al. |
| 2001/0026610 A1 | 10/2001 | Katz .......................... 379/93.13 | 2004/0038734 A1 | 2/2004 | Adams ......................... 463/25 |
| 2001/0027130 A1 | 10/2001 | Namba et al. ................. 463/42 | 2004/0048613 A1 | 3/2004 | Sayers ....................... 455/426.2 |
| 2001/0031663 A1 | 10/2001 | Johnson ........................ 463/42 | 2004/0053692 A1 | 3/2004 | Chatingny et al. |
| 2001/0036858 A1 | 11/2001 | McNutt et al. ............... 463/25 | 2004/0063497 A1 | 4/2004 | Gould .......................... 463/42 |
| 2001/0049275 A1 | 12/2001 | Pierry et al. ................. 455/414 | 2004/0068441 A1 | 4/2004 | Werbitt ........................ 705/16 |
| 2002/0034978 A1 | 3/2002 | Legge et al. | 2004/0068532 A1 | 4/2004 | Dewing ....................... 709/200 |
| 2002/0037767 A1 | 3/2002 | Ebin ............................. 463/25 | 2004/0092306 A1 | 5/2004 | George et al. ................ 463/29 |
| 2002/0049909 A1 | 4/2002 | Jackson et al. | 2004/0092311 A1 | 5/2004 | Weston ........................ 463/42 |
| 2002/0052231 A1 | 5/2002 | Fioretti ......................... 463/19 | 2004/0097283 A1 | 5/2004 | Piper et al. ................... 463/17 |
| 2002/0065097 A1 | 5/2002 | Brockenbrough ........... 455/552 | 2004/0097287 A1 | 5/2004 | Postrel ......................... 463/41 |
| 2002/0068631 A1 | 6/2002 | Raverdy ....................... 463/42 | 2004/0104274 A1 | 6/2004 | Koti |
| 2002/0074725 A1 | 6/2002 | Stern ............................. 273/274 | 2004/0104845 A1 | 6/2004 | McCarthy .................. 342/463 |
| 2002/0095586 A1 | 7/2002 | Doyle et al. | 2004/0111369 A1 | 6/2004 | Lane et al. .................... 705/40 |
| 2002/0111210 A1 | 8/2002 | Luciano ....................... 463/29 | 2004/0127277 A1 | 7/2004 | Walker et al. |
| 2002/0111213 A1 | 8/2002 | McEntee et al. ............. 463/42 | 2004/0127289 A1 | 7/2004 | Davis ........................... 463/42 |
| 2002/0119817 A1 | 8/2002 | Behm et al. .................. 463/17 | 2004/0132530 A1 | 7/2004 | Rutanen ....................... 463/42 |
| 2002/0124182 A1 | 9/2002 | Basco .......................... 713/200 | 2004/0137987 A1 | 7/2004 | Nguyen et al. |
| 2002/0125886 A1 | 9/2002 | Bates et al. .................. 324/307 | 2004/0142744 A1 | 7/2004 | Atkinson et al. |
| 2002/0142846 A1 | 10/2002 | Paulsen ........................ 463/43 | 2004/0162124 A1 | 8/2004 | Barton ........................... 463/1 |
| 2002/0143960 A1 | 10/2002 | Goren .......................... 709/229 | 2004/0162144 A1 | 8/2004 | Loose ........................... 463/42 |
| 2002/0147047 A1 | 10/2002 | Letovsky | 2004/0189470 A1 | 9/2004 | Girvin et al. |
| 2002/0147049 A1 | 10/2002 | Carter, Sr. .................... 463/42 | 2004/0192438 A1 | 9/2004 | Wells et al. ................... 463/29 |
| 2002/0151344 A1 | 10/2002 | Tanskanen .................... 463/17 | 2004/0192442 A1 | 9/2004 | Wells et al. |
| 2002/0155884 A1 | 10/2002 | Updike ......................... 463/25 | 2004/0198403 A1 | 10/2004 | Pedersen et al. ............ 455/517 |
| 2002/0160838 A1 | 10/2002 | Kim .............................. 463/42 | 2004/0209660 A1 | 10/2004 | Carlson ......................... 463/1 |
| 2002/0165020 A1 | 11/2002 | Koyama ....................... 463/17 | 2004/0209690 A1 | 10/2004 | Bruzzese ...................... 463/39 |
| 2002/0174336 A1 | 11/2002 | Sakakibara et al. | 2004/0219961 A1 | 11/2004 | Ellenby ......................... 463/1 |
| 2002/0191017 A1 | 12/2002 | Sinclair ........................ 345/740 | 2004/0224769 A1 | 11/2004 | Hansen ......................... 463/40 |
| 2002/0198044 A1 | 12/2002 | Walker ........................ 463/25 | 2004/0225565 A1 | 11/2004 | Selman ......................... 705/14 |
| 2003/0006931 A1 | 1/2003 | Mages ....................... 342/357.06 | 2004/0229685 A1 | 11/2004 | Smith ........................... 463/29 |
| 2003/0008662 A1 | 1/2003 | Stern et al. .................. 455/456 | 2004/0229699 A1 | 11/2004 | Gentles et al. ................ 463/42 |
| 2003/0013438 A1 | 1/2003 | Darby ......................... 455/419 | 2004/0248637 A1 | 12/2004 | Liebenberg et al. .......... 463/16 |
| 2003/0014639 A1 | 1/2003 | Jackson et al. | 2004/0259626 A1 | 12/2004 | Akram .......................... 463/17 |
| 2003/0028567 A1 | 2/2003 | Carlson ....................... 708/250 | 2004/0259631 A1 | 12/2004 | Katz et al. ..................... 463/25 |
| 2003/0031321 A1 | 2/2003 | Mages | 2004/0266533 A1 | 12/2004 | Gentles et al. ................ 463/42 |
| 2003/0032407 A1 | 2/2003 | Mages | 2005/0001711 A1 | 1/2005 | Doughty et al. ............ 340/5.74 |
| 2003/0032434 A1 | 2/2003 | Willner et al. ............... 455/456 | 2005/0003893 A1 | 1/2005 | Hogwood et al. ............ 463/42 |
| 2003/0036428 A1 | 2/2003 | Aasland ....................... 463/29 | 2005/0014554 A1 | 1/2005 | Walker et al. ................. 463/20 |
| 2003/0040324 A1 | 2/2003 | Eldering et al. .............. 455/456 | 2005/0020336 A1 | 1/2005 | Cesare .......................... 463/9 |
| 2003/0060286 A1 | 3/2003 | Walker et al. ................. 463/42 | 2005/0026670 A1 | 2/2005 | Lardie .......................... 463/16 |

| Publication No. | Date | Inventor |
|---|---|---|
| 2005/0026697 A1 | 2/2005 | Balahura .................... 463/42 |
| 2005/0054439 A1 | 3/2005 | Rowe et al. .................. 463/29 |
| 2005/0059397 A1 | 3/2005 | Zhao ...................... 455/345.2 |
| 2005/0059485 A1 | 3/2005 | Paulsen ...................... 463/29 |
| 2005/0086301 A1 | 4/2005 | Eichler et al. ............... 709/204 |
| 2005/0096109 A1 | 5/2005 | McNutt et al. ................ 463/6 |
| 2005/0096133 A1 | 5/2005 | Hoefelmeyer et al. ......... 463/40 |
| 2005/0107022 A1 | 5/2005 | Wichelmann ................ 452/77 |
| 2005/0130728 A1 | 6/2005 | Nguyen ...................... 463/16 |
| 2005/0137014 A1 | 6/2005 | Vetelainen ................... 463/42 |
| 2005/0143169 A1 | 6/2005 | Nguyen et al. ................ 463/25 |
| 2005/0159212 A1 | 7/2005 | Romney et al. .............. 463/25 |
| 2005/0170890 A1 | 8/2005 | Rowe et al. .................. 463/42 |
| 2005/0170892 A1 | 8/2005 | Atkinson |
| 2005/0181859 A1 | 8/2005 | Lind et al. .................... 463/17 |
| 2005/0181870 A1 | 8/2005 | Nguyen et al. ................ 463/29 |
| 2005/0192077 A1 | 9/2005 | Okuniewicz ................. 463/17 |
| 2005/0193209 A1 | 9/2005 | Saunders et al. ............ 713/182 |
| 2005/0197189 A1 | 9/2005 | Schultz ........................ 463/42 |
| 2005/0209002 A1 | 9/2005 | Blythe et al. .................. 463/42 |
| 2005/0215306 A1* | 9/2005 | O'Donnell et al. ............ 463/17 |
| 2005/0277471 A1 | 12/2005 | Russell et al. |
| 2005/0282638 A1 | 12/2005 | Rowe .......................... 463/42 |
| 2006/0019745 A1 | 1/2006 | Benbrahim |
| 2006/0035707 A1 | 2/2006 | Nguyen et al. |
| 2006/0040741 A1 | 2/2006 | Griswold et al. |
| 2006/0058102 A1 | 3/2006 | Nguyen et al. |
| 2006/0068917 A1 | 3/2006 | Snoddy et al. ................ 463/42 |
| 2006/0095790 A1 | 5/2006 | Nguyen et al. ............... 713/186 |
| 2006/0121970 A1 | 6/2006 | Khal .......................... 463/16 |
| 2006/0135259 A1 | 6/2006 | Nancke-Krogh et al. ...... 463/42 |
| 2006/0148560 A1 | 7/2006 | Arezina et al. ................ 463/29 |
| 2006/0148561 A1 | 7/2006 | Moser |
| 2006/0160626 A1 | 7/2006 | Gatto et al. |
| 2006/0163346 A1 | 7/2006 | Lee et al. .................... 235/380 |
| 2006/0165235 A1 | 7/2006 | Carlson ....................... 380/268 |
| 2006/0166740 A1 | 7/2006 | Sufuentes |
| 2006/0178216 A1 | 8/2006 | Shea et al. .................... 463/42 |
| 2006/0189382 A1 | 8/2006 | Muir et al. .................... 463/29 |
| 2006/0194589 A1 | 8/2006 | Sankisa .................... 455/456.1 |
| 2006/0205489 A1 | 9/2006 | Carpenter et al. ............. 463/29 |
| 2006/0234631 A1 | 10/2006 | Dieguez .................... 455/41.2 |
| 2006/0234791 A1 | 10/2006 | Nguyen et al. ................ 463/16 |
| 2006/0246990 A1 | 11/2006 | Downes ...................... 463/16 |
| 2006/0247039 A1 | 11/2006 | Lerner et al. ................. 463/29 |
| 2006/0247041 A1 | 11/2006 | Walker et al. ................ 463/29 |
| 2006/0252530 A1 | 11/2006 | Oberberger et al. ........... 463/29 |
| 2006/0287092 A1 | 12/2006 | Walker et al. ................ 463/41 |
| 2006/0287098 A1 | 12/2006 | Morrow et al. ................ 463/42 |
| 2007/0015564 A1 | 1/2007 | Walker et al. ................ 463/16 |
| 2007/0021213 A1 | 1/2007 | Foe et al. ..................... 463/42 |
| 2007/0032301 A1 | 2/2007 | Acres et al. .................. 463/42 |
| 2007/0054739 A1 | 3/2007 | Amaitis et al. |
| 2007/0060305 A1 | 3/2007 | Amaitis et al. |
| 2007/0060306 A1 | 3/2007 | Amaitis et al. |
| 2007/0060312 A1 | 3/2007 | Dempsey et al. .............. 463/25 |
| 2007/0060326 A1 | 3/2007 | Juds et al. |
| 2007/0060355 A1 | 3/2007 | Amaitis et al. |
| 2007/0060358 A1 | 3/2007 | Amaitis et al. |
| 2007/0099697 A1 | 5/2007 | Nelson ........................ 463/29 |
| 2007/0099703 A1 | 5/2007 | Terebilo ...................... 463/42 |
| 2007/0117634 A1 | 5/2007 | Hamilton et al. .............. 463/42 |
| 2007/0136817 A1 | 6/2007 | Nguyen ........................ 726/26 |
| 2007/0167237 A1 | 7/2007 | Wang et al. .................. 463/42 |
| 2007/0190494 A1 | 8/2007 | Rosenberg ................... 434/11 |
| 2007/0213120 A1 | 9/2007 | Beal et al. .................... 463/25 |
| 2007/0238507 A1 | 10/2007 | Sobel et al. |
| 2007/0257101 A1 | 11/2007 | Alderucci et al. |
| 2008/0004121 A1 | 1/2008 | Gatto et al. |
| 2008/0015013 A1 | 1/2008 | Gelman et al. |
| 2008/0026829 A1 | 1/2008 | Martin et al. |
| 2008/0051171 A1 | 2/2008 | Lutnick et al. |
| 2008/0058048 A1 | 3/2008 | Lutnick et al. |
| 2008/0058049 A1 | 3/2008 | Lutnick et al. |
| 2008/0070667 A1 | 3/2008 | Lutnick et al. |
| 2008/0085769 A1 | 4/2008 | Lutnick et al. |
| 2008/0102956 A1 | 5/2008 | Burman et al. |
| 2008/0102957 A1 | 5/2008 | Burman et al. |
| 2008/0139306 A1 | 6/2008 | Lutnick et al. |
| 2008/0161101 A1 | 7/2008 | Lutnick et al. |
| 2008/0167106 A1 | 7/2008 | Lutnick et al. |
| 2008/0191418 A1 | 8/2008 | Lutnick et al. |
| 2008/0214286 A1 | 9/2008 | Lutnick et al. |
| 2008/0248849 A1 | 10/2008 | Lutnick et al. |
| 2008/0254881 A1 | 10/2008 | Lutnick et al. |
| 2008/0254897 A1 | 10/2008 | Saunders et al. |
| 2008/0311994 A1 | 12/2008 | Amaitis et al. |
| 2008/0318670 A1 | 12/2008 | Zinder et al. |

FOREIGN PATENT DOCUMENTS

| | | |
|---|---|---|
| DE | 37 36 770 A1 | 5/1989 |
| DE | 43 16 652 A1 | 11/1994 |
| EP | 0840639 | 7/1996 |
| EP | 0506873 | 3/2000 |
| EP | 1066868 | 1/2001 |
| EP | 1202528 | 5/2002 |
| EP | 1291830 A2 | 3/2003 |
| EP | 1 475 755 A1 | 12/2003 |
| EP | 1475756 | 11/2004 |
| EP | 1531646 | 5/2005 |
| EP | 1259930 B1 | 6/2005 |
| GB | 2 248 404 | 4/1992 |
| GB | 2 256 594 | 12/1992 |
| GB | 2391432 | 2/2004 |
| GB | 2391767 | 2/2004 |
| GB | 2 406 291 | 3/2005 |
| JP | 5-317485 | 12/1993 |
| JP | 2000049046 | 2/2000 |
| JP | 2000218125 | 7/2000 |
| JP | 2000326491 | 10/2000 |
| JP | 2000345435 | 11/2000 |
| JP | 2000387614 | 12/2000 |
| JP | 2001236458 | 8/2001 |
| JP | 2002032515 | 1/2002 |
| JP | 2002107224 | 2/2002 |
| JP | 2002133009 | 5/2002 |
| JP | 2002149894 | 5/2002 |
| JP | 2002189831 | 7/2002 |
| JP | 2003078591 | 3/2003 |
| JP | 2003166050 | 6/2003 |
| JP | 2002024979 | 8/2003 |
| JP | 2003228642 | 8/2003 |
| JP | 2005005936 | 1/2005 |
| WO | WO 80/02512 A1 | 11/1980 |
| WO | WO 95/24689 | 9/1995 |
| WO | WO 96/00950 | 1/1996 |
| WO | WO 96/15837 | 5/1996 |
| WO | WO 98/09694 | 3/1998 |
| WO | WO 99/04873 | 2/1999 |
| WO | WO 99/08762 | 2/1999 |
| WO | WO99/42964 | 8/1999 |
| WO | WO 00/77753 A1 | 12/2000 |
| WO | 01/20538 | 3/2001 |
| WO | WO 01/17262 A1 | 3/2001 |
| WO | WO 01/40978 A2 | 6/2001 |
| WO | WO 01/48712 A1 | 7/2001 |
| WO | WO 01/48713 A1 | 7/2001 |
| WO | 01/67218 | 9/2001 |
| WO | WO 01/84817 A1 | 11/2001 |
| WO | WO 01/89233 A3 | 11/2001 |
| WO | WO 02/10931 | 2/2002 |
| WO | WO 02/21457 A1 | 3/2002 |
| WO | WO 02/39605 | 5/2002 |
| WO | WO 02/41199 | 5/2002 |
| WO | WO 02/065750 A2 | 8/2002 |

| | | |
|---|---|---|
| WO | WO 02/071351 A2 | 9/2002 |
| WO | WO 02/077931 A1 | 10/2002 |
| WO | WO 02/101486 | 12/2002 |
| WO | 03/015299 A1 | 2/2003 |
| WO | WO 03/013678 | 2/2003 |
| WO | WO 03/027970 | 4/2003 |
| WO | 03/045519 | 6/2003 |
| WO | 03/081447 | 10/2003 |
| WO | WO 2004/000428 A1 | 12/2003 |
| WO | WO 2004/003810 | 1/2004 |
| WO | WO 2004/014506 | 2/2004 |
| WO | WO 2004/023253 | 3/2004 |
| WO | 2004/027689 A2 | 4/2004 |
| WO | WO 2004/073812 | 9/2004 |
| WO | WO 2004/104763 | 12/2004 |
| WO | WO 2004/114235 | 12/2004 |
| WO | WO 2005/015458 A1 | 2/2005 |
| WO | WO 2005/026870 | 3/2005 |
| WO | WO 2005/031627 | 4/2005 |
| WO | WO 2005/031666 | 4/2005 |
| WO | WO 2005/036425 | 4/2005 |
| WO | WO 2005/050574 A2 | 6/2005 |
| WO | 2006/023230 | 3/2006 |
| WO | WO 2007/008601 A2 | 1/2007 |

OTHER PUBLICATIONS

PCT Notification of Transmittal of the International Search Report and the Written Opinion of the International Searching Authority, or the Declaration with attached PCT International Search Report and Written Opinion of the International Searching Authority in International Application No. PCT/US06/26343 filed Jul. 7, 2006 (10 pages), mailed Jan. 19, 2007.
*Notification of Transmittal of the International Search Report and the Written Opinion of the International Searching Authority, or the Declaration* for International Application No. PCT/US06/26346; 8 pages, Mar. 29, 2007.
*Notification of Transmittal of the International Search Report and the Written Opinion of the International Searching Authority, or the Declaration* for International Application No. PCT/US05/05905; 10 pages, Apr. 10, 2007.
*Notification of Transmittal of the International Search Report and the Written Opinion of the International Searching Authority, or the Declaration* for International Application No. PCT/US06/26350; 8 pages, Apr. 27, 2007.
Stephan Neuert, et al.; The British Library; *Delivering Seamless Mobile Services over Bluetooth* ; 11 pages, unknown.
*United States Patent and Trademark Office, Office Action* for U.S. Appl. No. 11/210,482; 26 pages, Jul. 27, 2007.
Janna Lindsjö, et al.; *GIGANT—an Interactive, Social, Physical and Mobile Game*; PDC 2002 Proceedings of the Participatory Design Conference; Malmö, Sweden; 5 pages, Jun. 23-25, 2002.
*Notification of Transmittal of the International Search Report and the Written Opinion of the International Searching Authority* for International Application No. PCT/US06/06315; 10 pages, Sep. 24, 2007.
*Notification of Transmittal of the International Search Report and the Written Opinion of the International Searching Authority* for International Application No. PCT/US06/26599; 7 pages, Sep. 24, 2007.
*USPTO Office Action Summary* for U.S. Appl. No. 11/201,812, filed Aug. 10, 2005; 32 pages, Sep. 27, 2007.
*United States Patent and Trademark Office: Office Action* for U.S. Appl. No. 11/199,835, filed Aug. 9, 2005, in the name of Lee M. Amaitis; 17 pages, Mar. 2, 2007.
*United States Patent and Trademark Office: Office Action* for U.S. Appl. No. 11/063,311, filed Feb. 21, 2005, in the name of Lee M. Amaitis; 18 pages, May 4, 2007.
*United States Patent and Trademark Office: Office Action* for U.S. Appl. No. 11/063,311, filed Feb. 21, 2005, in the name of Lee M. Amaitis; 27 pages, Oct. 31, 2007.
*Notification of Transmittal of the International Search Report and the Written Opinion of the International Searching Authority* for International Application No. PCT/US06/26348; 9 pages, Dec. 28, 2007.

*Australian Patent Office Written Opinion and Search Report* for Application No. SG 200605830-9; 11 pages; Nov. 29, 2007.
*Australian Patent Office; Examination Report* for Singapore Patent Application No. 0605830-9; 5 pages, Jul. 7, 2008.
*PCT Notification of Transmittal of the International Search Report and the Written Opinion of the International Searching Authority* for International Application No. PCT/US07/66873; 4 pages, Aug. 4, 2008.
*PCT Notification of Transmittal of the International Search Report and the Written Opinion of the International Searching Authority* for International Application No. PCT/US2008/057239; 8 pages, Aug. 7, 2008.
U.S. PTO Office Action for U.S. Appl. No. 11/210,482; 24 pages; Apr. 29, 2009.
Australian Examination Report for AU Application 2006269418; 2 pages; Mar. 12, 2009.
U.S. PTO Office Action U.S. Appl. No. 11/063,311; 14 pages; Apr. 29, 2009.
U.S. PTO Office Action for U.S. Appl. No. 11/199,831; 9 pages; Dec. 19, 2008.
U.S. PTO Office Action for U.S. Appl. No. 10/835,995; 11 pages; Jan. 22, 2009.
U.S. PTO Office Action for U.S. Appl. No. 11/406,783; Feb. 9, 2009.
U.S. Appl. No. 11/686,354, filed Mar. 15, 2007, entitled "Game Access Device with Time Varying Signal."
Office Action for Pending U.S. Appl. No. 11/063,311 entitled System and Method for Convenience Gaming by Lee M. Amaitis, et al.; Jul. 10, 2008.
USPTO Office Action for U.S. Appl. No. 11/418,939, Dec. 17, 2007 (13 pages).
USPTO Office Action for U.S. Appl. No. 11/418,939, Aug. 20, 2008 (12 pages).
USPTO Office Action for U.S. Appl. No. 11/418,939, Apr. 10, 2007.
U.S. Appl. No. 11/418, 939, filed May 5, 2006, entitled "Systems and methods for providing access to wireless gaming devices."
U.S. Appl. No. 11/406,783, filed May 5, 2006 entitled "Systems and methods for providing access to wireless gaming devices."
Solutions for Restaurants, Hotels & Resorts and Clubs- Guest bridge, Inc. (online). Guestbridge, Inc. Feb. 6, 2007 [retrieved on Aug. 21, 2008]. Retrieved from the Internet: <URL: http://web.archive.org/web/20070206134139/www.guestbridge.com/solutions.html, entire document especially p. 1.
*Notification of Transmittal of the International Search Report and the Written Opinion of the International Searching Authority, or the Declaration* for International Application No. PCT/US08/56120, 14 pages, Aug. 29, 2008.
Pending U.S. Appl. No. 11/839,404, filed Aug. 15, 2007.
Pending U.S. Appl. No. 11/839,412, filed Aug. 15, 2007.
Pending U.S. Appl. No. 11/839,404, filed Aug. 15, 2007.
Pending U.S. Appl. No. 11/683,476, filed Mar. 8, 2007.
Pending U.S. Appl. No. 11/683,508, filed Mar. 8, 2007.
Pending U.S. Appl. No. 11/685,999, filed Mar. 14, 2007.
Pending U.S. Appl. No. 12/197,809, filed Aug. 25, 2008.
U.S. PTO Office Action for U.S. Appl. No. 11/256,568; 17 pages; Oct. 21, 2008.
U.S. Appl. No. 11/553,130, filed Oct. 26, 2006, Burman et al.
U.S. Appl. No. 11/553,142, filed Oct. 26, 2006, Burman et al.
U.S. Appl. No. 12/197,809, filed Aug. 25, 2008, Amaitis et al.
U.S. Appl. No. 12/247,623, filed Oct. 8, 2008, Amaitis et al.
U.S. Appl. No. 11/199,835, filed Aug. 9, 2005, Amaitis et al.
U.S. Appl. No. 11/201,812, filed Aug. 10, 2005, Amaitis et al.
U.S. Appl. No. 11/199,831, filed Aug. 9, 2005, Amaitis et al.
U.S. Appl. No. 11/210,482, filed Aug. 24, 2005, Amaitis et al.
U.S. Appl. No. 11/199,964, filed Aug. 9, 2005, Amaitis et al.
U.S. Appl. No. 11/467,078, filed Aug. 24, 2006, Lutnick et al.
U.S. Appl. No. 11/468,809, filed Aug. 31, 2006, Lutnick et al.
U.S. Appl. No. 11/470,250, filed Sep. 5, 2006, Lutnick et al.
U.S. Appl. No. 11/533,300, filed Sep. 19, 2006, Lutnick et al.
U.S. Appl. No. 11/539,518, filed Oct. 6, 2006, Lutnick et al.
U.S. Appl. No. 11/618,426, filed Dec. 29, 2006, Lutnick et al.
U.S. Appl. No. 11/674,232, filed Feb. 13, 2007, Lutnick et al.
U.S. Appl. No. 11/680,764, filed Mar. 1, 2007, Lutnick et al.
U.S. Appl. No. 11/697,024, filed Apr. 5, 2007, Lutnick et al.

U.S. Appl. No. 11/733,902, filed Apr. 11, 2007, Lutnick et al.
U.S. Appl. No. 11/846,696, filed Aug. 29, 2007, Lutnick et al.
U.S. Appl. No. 11/868,013, filed Oct. 5, 2007, Lutnick et al.
U.S. Appl. No. 12/194,593, filed Aug. 20, 2008, Lutnick et al.
U.S. Appl. No. 11/567,322, filed Dec. 6, 2006, Lutnick et al.
U.S. Appl. No. 11/621,369, filed Jan. 9, 2007, Lutnick et al.
U.S. Appl. No. 12/147,005, filed Jun. 26, 2008, Lutnick et al.
Business Wire; *Home Gambling Network Inc., With U.S. Patent 5,800,268—Business/Gambling—HGN and UUNET, a WorldCom/MCI Company, Reach a Mutually Satisfactory Resolution in Patent Suit*; 2 pages, Mar. 19, 1999.
PR Newswire; *Nokia N-Gage (TM) Mobile Game Deck—The Revolutionary Gaming Experience; Major Global Games Publishers Excited to Publish on Wireless Multiplayer Platform*; 3 pages, Feb. 6, 2003.
Business Wire; *GoldPocket Interactive Launches EM Mobile Matrix, Industry's First Fully Synchronous Interactive Television and Massively Multi-Player Gaming Solution*; 2 pages, Mar. 17, 2003.
Brand Strategy; *The National Lottery has Announced that UK Consumers Will be Able to Purchase Tickets Using the Internet, TV and Mobile Phones*; (Launches & Rebrands); ISSN 0965-9390; 1 page, Apr. 2003.
PR Newswire; *Ideaworks3D Appointed by Eidos Interactive to Develop Blockbuster Line-Up for Nokia N-Gage Mobile Game Deck*; 2 pages, May 23, 2003.
Telecomworldwide; *New Mobile Lottery Service Launched by mLotto*; 1 page, Oct. 30, 2003.
Singh, et al.; *Anywhere, Any-Device Gaming*; Human Interface Technology Laboratory; National University of Singapore; 4 pages, 2004.
Wu, et al.; The Electronic Library; *Real Tournament—Mobile Context-Aware Gaming for the Next Generation*; vol. 22; No. 1; ISBN 0-86176-934-1; ISSN 0264-0473; 11 pages, 2004.
*Precision Marketing*; vol. 16; No. 11; ISSN 0955-0836; 2 pages, Jan. 9, 2004.
Online Reporter; *GTECH Takes Lottery Mobile*; 1 page, Feb. 28, 2004.
Personal and Ubiquitous Computing; *Human Pacman: a Mobile, Wide-Area Entertainment System Based on Physical, Social, and Ubiquitous Computing*; 12 pages, May 2004.
PR Newswire; *M7 Networks Partners With Terraplay to Deliver Real-Time Multiplayer Gaming Functionality to its Community Services Offerings*; 2 pages, Jun. 1, 2004.
China Telecom; *Win Win Gaming Inc. Announces Agreement to Provide Wireless Lottery and Entertainment Content in Shanghai*; vol. 11; No. 9; 2 pages, Sep. 2004.
Business Wire; *EA Announces Next Step Into Mobile Gaming; Digital Bridges Named as Strategic Partner for Distribution of Mobile Interactive Entertainment in Europe; North and South America*; 3 pages, Sep. 2, 2004.
Wireless News; *Mobile Casinos, Lotteries Good News for Mobile Revenues*; 2 pages, Feb. 23, 2005.
Business Wire; *MobileGamingNow, Inc. Announces the Launch of the First Ever Mobile Phone Interactive, Multi-Player Gaming System for Poker*; 2 pages, Apr. 4, 2005.
Business Wire; *InfoSpace's Golf Club 3D Scores Hole-in-One for Exciting and Realistic Game Play; InfoSpace's 3D Golf Captures the Challenge and Realism of the Sport With Real-Time 3D Animation, Weather Effects, and Customizable Characters*; 2 pages, Apr. 21, 2005.
Business Wire; *July Systems' Play2Win Interactive Game Service Launched on UK's MobileGaming.com; Speedy Customer Deployments Now Possible With July's New UK Mobile Retailing Infrastructure*; 2 pages, May 4, 2005.
Pending U.S. Appl. No. 10/835,995 entitled *System and Method for a Convenience Gaming* by Lee M. Amaitis, et al; 46 total pages, filed Apr. 29, 2004.
Pending U.S. Appl. No. 11/063,311 entitled *System and Method for Convenience Gaming* by Lee M. Amaitis, et al; 44 total pages, filed Feb. 21, 2005.
Pending U.S. Appl. No. 11/199,835 entitled *System and Method for Wireless Gaming System With User Profiles* by Lee M. Amaitis, et al; 72 total pages, filed Aug. 9, 2005.
Pending U.S. Appl. No. 11/199,831 entitled *System and Method for Wireless Gaming System With Alerts* by Lee M. Amaitis, et al; 66 total pages, filed Aug. 9, 2005.
Pending U.S. Appl. No. 11/201,812 entitled *System and Method for Wireless Gaming With Location Determination* by Lee M. Amaitis, et al; 53 total pages, filed Aug. 10, 2005.
Pending U.S. Appl. No. 11/199,964 entitled *System and Method for Providing Wireless Gaming as a Service Application* by Lee M. Amaitis, et al; 76 total pages, filed Aug. 9, 2005.
Pending U.S. Appl. No. 11/210,482 entitled *System and Method for Peer-to-Peer Wireless Gaming* by Lee M. Amaitis, et al; 72 total pages, filed Aug. 24, 2005.
Pending U.S. Appl. No. 11/557,125 entitled *System and Method for Convenience Gaming* by Lee M. Amaitis, et al; 44 total pages, filed Nov. 7, 2006.
Pending U.S. Appl. No. 11/557,131 entitled *System for Convenience Gaming* by Lee M. Amaitis, et al; 44 total pages, filed Nov. 7, 2006.

* cited by examiner

SYSTEM AND METHOD FOR WIRELESS LOTTERY

TECHNICAL FIELD

The present invention relates generally to the field of contests and, more particularly, to systems and methods for managing a wireless lottery.

BACKGROUND

Lotteries are generally known. In a lottery, a number of participants purchase tickets, each of which represents a chance to win a prize. In some cases, a portion of the revenue from ticket sales provides the winning prize. Many states have lotteries and the lotteries are typically run by the state. Most states have several different games, including instant-win scratch-off games, daily games and games where the participant must pick at least three or four correct numbers to win a prize. Often a lottery system will have a game with the largest possible payout, or prize. This game usually involves picking the correct six numbers from a set of numbers (e.g., from 1 to 50).

The odds of winning a prize may be calculated. The odds of picking a single correct number depend on how many possible numbers are available and how many have been used. For instance, assuming none of the six numbers has been picked and assuming there are 50 possible numbers to choose from, and assuming there will be six numbers selected overall, there are six chances to pick a given number correctly. The odds of picking one number correctly are, therefore, 50/6, or 8.33:1. Using a similar calculation, one can determine the odds of picking another number correctly after one number has already been drawn. There are 49 possible numbers left, and five more numbers will be drawn. So the odds of picking a number correctly after one has been drawn are 49/5, or 9.8:1. The odds may be calculated for picking the remaining numbers. The odds of picking all six numbers are then calculated by multiplying all of the odds for the individual numbers. The odds are: $50/6 \times 49/5 \times 48/4 \times 47/3 \times 46/2 \times 45/1 = 15,890,700:1$.

Winnings (prizes) may be determined and paid out according to various methods. For example, a state lottery might have a $10 million jackpot. The actual ticket revenues will be much higher than the jackpot. There are typically additional prizes that must be paid. Also, most states use a large portion of the lottery revenues to pay for various services and equipment. Lottery revenue may be used to pay for education, roads, disaster relief, human services programs, etc. Once it has been determined how much of the revenue will be left for the prize, the prize itself may be paid out in different ways, such as in an annual payment for some period of years, or in a lump sum.

Typically, lottery tickets are sold through retailers that are authorized by the states. The retailers are usually stores, such as convenience stores. A retailer is commonly paid a sales commission based on certain parameters. The parameters may include percentages, amounts sold, number of tickets sold, commission caps, and bonuses. In New York, for example, retailers are paid commissions of 6% of the sales of lottery tickets. Typically, a commission is paid as a percentage of the sale and is paid to the retailer making the sale.

SUMMARY

Certain embodiments of the present invention are generally directed to systems and methods for providing a wireless lottery. Tickets may be purchased using a wireless communication device. A problem arises in allowing consumers to purchase tickets using a wireless device in that there is not presently a satisfactory way to determine how sales commissions will be paid. For example, if a customer uses a mobile phone to make a purchase, then the customer has not purchased the ticket directly from a retailer. Therefore, without an acceptable solution, as presented by the various embodiments described herein, a retailer that might have otherwise sold a ticket to the customer might lose the sales commission for that ticket.

In one embodiment a contest system is provided. The system includes a contest platform operable to receive purchase information corresponding to the purchase of one or more contest entries. The purchase may be made using an electronic communication device. The system also includes a location determination module operable to determine a location of the electronic communication device. The contest platform is also operable to determine one or more sales commissions associated with the purchase based at least partially on the location of the electronic communication device. The purchase may be, for example, the purchase of a lottery ticket.

In another embodiment, an electronic communication device is provided that may be used to make a purchase (e.g., of a lottery ticket). The device includes a receiver, a transmitter, and a data input device. The data input device receives input from a user. The input corresponds to the purchase of a contest entry. The transmitter is operable to transmit the input to a contest platform, and is further operable to transmit a signal useable by the platform to determine the location of the electronic communication device. The platform may further determine a sales commission for the purchase based at least partially on the location.

In another embodiment a purchasing system is provided. The purchasing system includes a purchase management platform operable to receive purchase information corresponding to the purchase of one or more items. The purchase may be made using an electronic communication device. The purchasing system may include a location determination module operable to determine a location of the electronic communication device. The purchase management platform may also be operable to determine one or more credits associated with the purchase based at least partially on the location of the electronic communication device.

In another embodiment, a method is provided for determining credit for a sale made using an electronic communication device. One step involves determining a location of the electronic communication device. Another step involves determining the credit based at least partially on the location.

Various embodiments of the present invention may benefit from numerous advantages. It should be noted that one or more embodiments may benefit from some, none, or all of the advantages discussed below.

One advantage is that contest entries, such as lottery tickets, may be purchased wirelessly and that associated retailer commissions may be fairly determined and distributed. Another advantage is an increase in purchases due at least partially to the convenience of being able to make purchases using the electronic communication device. Another advantage is that data associated with purchases, such as location data, may be determined, captured, stored, and processed to create additional related data and/or to enable the execution of on or more events related to the purchase information. Another advantage is that retailers can send messages to users that make purchases using the electronic device and these messages may be based at least partially on the user location and may also be associated with the type of item (e.g., lottery ticket) being purchased.

Other advantages will be readily apparent to one having ordinary skill in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION

Various embodiments are generally directed to systems and techniques to provide lottery services. In certain cases, the services are performed wirelessly. Accordingly, a system may be configured to offer and manage wireless lottery activities. According to one feature, the system is configured to determine which lottery retailer should be credited for a wireless sale of a lottery ticket. For example, a user may view the wireless lottery option as a seamless transaction with no apparent distinction as to lottery ticket retailers. However, based on one or more parameters, the system determines one or more retailers that should be credited, or share in the credit, for a particular sale of a lottery ticket. This may be accomplished, for instance, by determining the location of the wireless purchaser when the purchase is made. A system may then determine the appropriate lottery retailer to be credited based on the purchaser location. For example, the system may be configured to credit the retailer closest to the purchaser at the time of the transaction. Optionally, the system may be configured to credit all retailers within a particular range of the purchaser. Alternatively, the purchaser may establish a "home" retailer as the credited retailer. The home retailer is then credited regardless of where the purchaser is located.

Alternatively, the system may be configured to enable the purchaser to purchase a ticket only when certain criteria are met. For example, a purchase may be made with the user is within a certain distance from an advertisement (e.g., a billboard) and when the user enters an appropriate code on the device. In such a case, the retailer(s) associated with the advertisement and/or the code may be credited with the sale of the lottery ticket. In another example, the system may be configured to determine when a purchaser enters a particular property (e.g., the parking lot of a particular convenience store). The system may permit the purchaser to purchase a ticket remotely (e.g., from the car) once the purchaser is located within certain boundaries or within a certain range of some predetermined point.

According to certain related aspects, merchants that sell the wireless lottery tickets, or are credited with the sale, may, within a certain range, send messages (e.g., advertisements) back to the user who is purchasing a ticket. For example, if a user purchases a ticket, the four agents within ¼ mile of the purchaser may be allowed to send a message to the user, which is viewable on the user's device. One of the merchants might send a message, for example, that indicates the merchant will give the user a free coffee if the user comes in for a visit. The message may also include directions to the merchant's store. The wireless lottery services may be provided as an add-on, or ancillary service, in conjunction with a basic telecommunications service.

Figure 1:
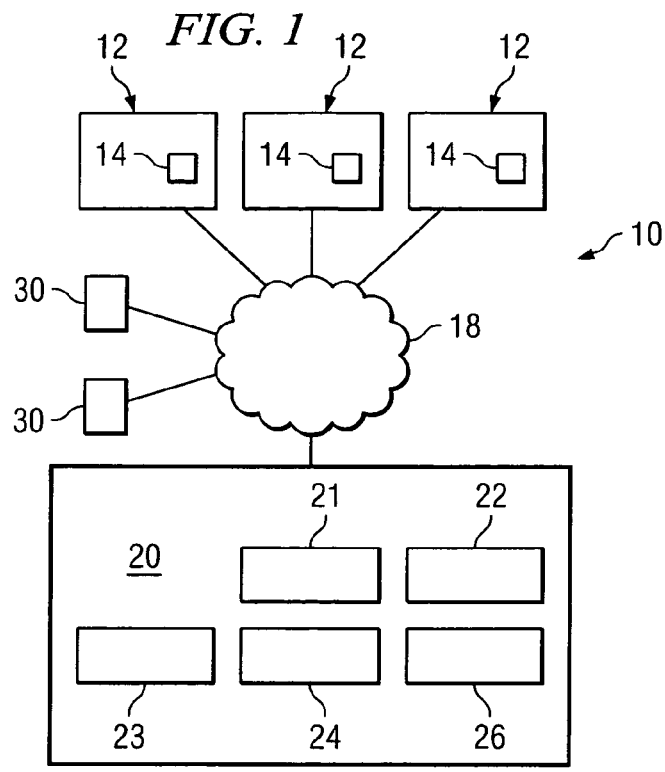
FIG. 1 illustrates a wireless lottery system according to an embodiment of the present invention.

As shown in FIG. 1, for example, lottery system 10 includes one or more communication devices 12, each having a display 14 to allow a user to interact with system 10 as described herein. Communication devices 12 communicate with other elements of system 10 over a communications network 18. Also included in system 10 are one or more retailers 30, which may be (for example) stores that sell goods and/or services. Retailers 30 may be credited with sales made through devices 12 according to the various parameters and methods described herein. System 10 also includes a lottery management platform 20. Platform 20 includes at least one processor 21, at least one memory 22, and at least one network interface 23. Platform 20 also includes a location determination module 24 for determining the location of the one or more communication devices 12, and a commission determination module 26 for determining commissions (or other credit) for sales made using the devices 12.

Communication devices 12 may include any devices that are capable of receiving and transmitting information, such as voice and/or data information, electronically. Communication devices 12, may have a display 14 for displaying, for example, a graphic user interface (GUI) to allow a user to perform various actions permitted by the system 10. These various actions may be related to any of the various aspects of purchasing lottery tickets and communicating information between a device 12 and any of the other components of system 10.

It should be understood that although certain embodiments are described in terms of the sales of lottery tickets, various embodiments have applicability to sale of any entry including, without limitation, contest entries, state lotteries, scratch-off lotteries, instant lotteries. Also applicable are the sales of entertainment tickets such as concert tickets and sporting event tickets. Also applicable are sales of any other product or service for which a commission may be paid. This includes sales of goods and property, sales of travel related services, sales of securities and other investment vehicles, etc.

Communication devices 12 may be wireless communication devices, but the present invention is not so limited. Devices 12 may include, without limitation, mobile phones, personal data assistants (PDAs), computers, mini-computers, etc. Communication devices 12 may transmit and receive information to and from communications network 18. Information is also transmitted between network 18 and platform 20. Information may also be transmitted between any of these components and one or more retailers 30.

Information transmitted across network 18 may include any information, in any format, which is necessary or desirable in the operation of the wireless lottery system. The information may be transmitted in whole, or in combination, in any format including digital or analog, text or voice, and according to any known or future transport technologies, which may include, for example, wireline or wireless technologies. Wireless technologies may include, for example, licensed or license-exempt technologies. Some specific technologies which may be used include, without limitation, Code Division Multiple Access (CDMA), Global System for Mobile Communication (GSM), General Packet Radio Service (GPRS), WiFi (802.11x), WiMax (802.16x), Public Switched Telephone Network (PSTN), Digital Subscriber Line (DSL), Integrated Services Digital Network (ISDN), or cable modem technologies. These are examples only and one of ordinary skill will understand that other types of communication techniques are within the scope of the present invention. Further, it will be understood that additional components may be used in the communication of information between users, retailers, and the wireless lottery platform. Such additional components may include, without limitation, lines, trunks, antennas, switches, cables, transmitters, receivers, computers, routers, servers, fiber optical transmission equipment, repeaters, amplifiers, etc.

According to one embodiment, the communications network comprises a cellular network. The cellular network comprises a plurality of base stations, each of which has a corresponding coverage area. Base station technology is generally known and the base stations may be of any type found in a typical cellular network. The base stations may have coverage areas that overlap. Further, the coverage areas may be sectorized or non-sectorized. The network also includes mobile stations, which function as the communication devices 12 used by users to access the lottery platform and participate in the lottery activities. Users are connected to the network of base stations via transmission and reception of radio signals. The communications network also includes at least one voice/data switch, which may be connected to the wireless portion of the network via a dedicated, secure landline. The lottery platform 20 may likewise be connected to the voice/data switch via a dedicated, secure landline. The voice/data switch may be connected to the wireless network of base stations via a mobile switching center (MSC), for example, and the landline may be provided between the voice/data switch and the MSC.

Users access the lottery platform and or system by way of mobile stations which are in communication with, and thus part of, the communications network. The mobile station may be any electronic communication device that is operable in connection with the network as described. For example, in this particular embodiment, the mobile station may comprise a cellular telephone.

In the case of a cellular network for example, the lottery system may be enabled through the use of a private label carrier network. Each base station is programmed by the cellular carrier to send and receive private secure voice and/or data transmissions to and from mobile station handsets. The handsets are preferably pre-programmed with both gaming software and the carrier's authentication software. The base stations communicate via Private T-1 lines to a switch. Encryption can be installed on the telephones if required by a regulating authority.

The cellular network may be a private, closed system. Mobile stations communicate with base stations and base stations are connected to a centralized switch. At the switch, voice calls are transported either locally or via long distance. Specific service provider lottery traffic is transported from the central switch to a lottery server at a host location.

As users begin a lottery activity, the handset will only talk to certain base stations with cells or sectors that have been engineered to be wholly within the jurisdiction permitting and/or controlling the applicable lottery. For example, if a base station is close enough to pick up or send a signal across state lines, it might not be able to communicate with the device. When a customer uses the device for lottery activities, the system may prohibit, if desired, the making or receiving voice calls. Moreover, voice can be eliminated entirely if required. Further, the devices might not be allowed to "connect" to the Internet. This ensures a high level of certainty that purchase of lottery tickets originates and terminates within the boundaries of an applicable lottery jurisdiction and the "private" wireless system cannot be circumvented or bypassed. In certain embodiments some data and/or voice traffic may be communicated at least partially over the Internet. Alternatively, in some embodiments, certain non-lottery information may be transported over a path which includes the Internet, while other information relating to the lottery activities of the system is transported on a path that does not include the Internet. In still other embodiments, even lottery information may be transported either wholly or partially over the Internet. This might be the case, for example, in jurisdictions which allow the purchase of lottery tickets over the Internet.

In another embodiment, for example, the communications network comprises a private wireless network. The private wireless network may include, for example, an 802.11x (WiFi) network technology. Various WiFi networks may comprise the communication network. The networks may use other communications protocols to provide a private wireless network including, but not limited to, 802.16x (WiMax) technology. Also, system 10 may comprise a combination of networks. For example, system 10 may comprise a combination of private wireless networks, a cellular network comprising a multi-channel access unit or sectorized base station, and a satellite network comprising one or more satellites With respect to the private wireless network, because certain technology covers smaller areas, (e.g., in the range of 100-300 feet) and provides very high-speed throughput, the private wireless network is particularly well-suited for any jurisdictional needs of location and identity verification. It should be understood that the configuration and description of the overall lottery system 10 is intended only as an example and may be modified within the scope of the present invention.

In one embodiment, the system architecture for the lottery system includes:
(1) a wireless LAN (Local Access Network) component, which consists of mostly 802.11x (WiFi) and/or 802.16x WiMax technologies; robust security and authentication software; gaming software; mobile carrier approved handsets with Windows® or Symbian® operating systems integrated within;
  (a) CDMA-technology that is secure for over-the-air data protection;
  (b) at least two layers of user authentication, (that provided by the mobile carrier and that provided by the lottery platform provider);
  (c) compulsory tunneling (static routing) to gaming servers;
  (d) end-to-end encryption at the application layer; and
  (e) state-of-the-art firewall and DMZ technologies;
(2) an MWAN (Metropolitan Wireless Access Network), which consists of licensed and license-exempt, point-to-point links, as well as licensed and license-exempt point-to-multi-point technologies;
(3) private MAN (Metropolitan Access Network) T-1 and T-3 lines to provide connectivity where wireless services cannot reach; and
(4) redundant private-line communications from the mobile switch back to the lottery platform.

As further shown in FIG. 1, communication devices 12 are in communication with a lottery management platform 20 over network 18. The lottery management platform 20 preferably has one or more servers or processors 21, on which are resident various lottery and lottery management applications. These applications may include, for example, a lottery sales application, a commission determination application, a location determination application, a lottery transaction tracking application, and an information transmission application.

These applications may be embodied in one or more software modules. The applications may be combined in any possible configuration. Additionally, it should be understood that these applications are not exhaustive and that other applications may exist to provide an environment to the user that is associated with any of the described or potential lottery activities. Processor 21 is operable to execute any of the software, routines, applications, etc. associated with the various functionality or modules described herein. Processor 21 may be any suitable processor, computer, server, etc., or any combination thereof.

Platform 20 also includes at least one memory 22. Memory 22 is operable store any data, software, parameters, etc. necessary for system 10 to perform the various tasks described herein. Memory 22 may store, for example, user IDs for the various users of communication devices 12, percentages and other parameters used to determine commissions, locations of fixed elements of system 10 such as the locations of the one or more retailers 30, etc. Memory 22 may be any suitable memory including one or more random access memories (RAMs), read-only memories (ROMs), dynamic random access memories (DRAMs), fast cycle RAMs (FCRAMs), static RAM (SRAMs), field-programmable gate arrays (FPGAs), erasable programmable read-only memories (EPROMs), electrically erasable programmable read-only memories (EEPROMs), microcontrollers, or microprocessors.

Platform 20 also includes at least one network interface 23 for receiving information from, and transmitting information to, other components or elements within system 10.

Lottery management platform 20 includes a location determination module 24, which is operable to determine the location of a communication device 12. An associated verification application may be additionally operable to permit or disable the purchase of a lottery ticket (or the conduct of other lottery activities) from a particular location depending upon whether or not the location meets one or more criteria. The criterion may be, for example, whether the location is within a predefined area in which lottery sales are permitted by law.

The location determination technology used in the determination module 24 may include, without limitation, "network-based" and/or "satellite-based" technology. Network-based technology may include such technologies as multilateration, triangulation and geo-fencing, for example. Satellite-based technologies may include global positioning satellite (GPS) technology, for example.

As previously discussed, a cellular approach may include the use of at least one cellular, mobile, voice and data network. For lottery activities in certain jurisdictions, the location determination technology may involve triangulation, global positioning satellite (GPS) technology, and/or geo-fencing to avoid the potential for lottery activities to be undertaken outside applicable boundaries. Triangulation may be used as a method for determining location of a communication device 12. Triangulation may be accomplished, for example, by comparing the signal strength from a single mobile station received at multiple base stations, each having GPS coordinates. This technology may be used to pinpoint the location of a mobile station (i.e., a communication device). The location can then be compared to a map or other resource to determine whether the user of the mobile station is in an unapproved area. Alternatively, GPS technology may be used for these purposes.

Any suitable type of location determination techniques may be used to determine the location of device 12, to determine whether a device 12 may be used to participate in the various lottery activities described herein, and/or to determine credit for sales based on device location. Such techniques include, without limitation, the following.

One technique that may be used is "geo-fencing." Geo-fencing may be used, for example, to disable a device that is not within specified boundaries. Geo-fencing does not specify location. Rather, it ensures that a mobile station is within certain boundaries. For instance, geo-fencing may be used to ensure that a mobile station beyond state lines does not access the lottery system 10. Triangulation is another technique that may be used. Triangulation specifies a pinpoint, or near-pinpoint, location of the device. For example, a device might be triangulated between three base stations to determine the location of the device. Triangulation may be used to identify whether a device, such as a mobile station, is located in a specific area. The location determination technology utilized in conjunction with the present invention may be specified to meet the Federal Communication Commission's (FCC's) Phase 2 E911 requirements. Geological Institute Survey (GIS) mapping may also be utilized to compare identified coordinates of a communication device with GIS map features or elements to determine whether a device is in a particular area. It should be noted that any type of location verification may be used such as triangulation, geo-fencing, global positioning satellite (GPS) technology, signal strength comparisons, time difference of arrival (TDOA) or any other type of location determining technology, which can be used to ensure or provide an acceptable level of confidence, that the user is in a particular location or within specified boundaries.

In another embodiment, location verification is accomplished using channel address checking or location verification using some other identifying number or piece of information indicative of which network or portion of a network is being accessed by the communication device. Assuming the using of an identifying number for this purpose, then according to one method of location checking, as an example, a participant accesses the lottery system via a mobile telephone. The identifying number of the mobile telephone, or of the network component being accessed by the mobile telephone, identifies the caller's connection to the mobile network. The number is indicative of the fact that the caller is in a defined area and is on a certain mobile network. A server application may be resident on the mobile telephone to communicate this information via the network to the lottery platform. In a related embodiment, the identifying number or information is passed from a first network provider to a second network provider. For example, a caller's home network may be that provided by the second provider, but the caller is roaming on a network (and in a jurisdiction) provided by the first provider. The first provider passes the identifying information through to the second provider to enable the second provider to determine whether the caller is in a defined area that does or does not allow the relevant lottery activity. Preferably the lottery platform either maintains, or has access to, a database that maps the various possible worldwide mobile network identifying numbers to geographic areas. The invention contemplates using any number or proxy that indicates a network, portion of a network, or network component, which is being connected with a mobile telephone. The identifying number may indicate one or more of a base station or group of base stations, a line, a channel, a trunk, a switch, a router, a repeater, etc.

In another embodiment, when the user connects his mobile telephone to the lottery platform, the lottery platform draws the network identifying information. Software resident on the communication device may incorporate functionality that will, upon login or access by the user, determine the user's location (based at least in part on the identifying information)

and send a message to the lottery platform. The identifying number or information used to determine location may be country-specific, state-specific, town-specific, or specific to some other definable boundaries.

In connection with any of the location determination methods, the lottery platform may periodically update the location determination information. This may be done, for example, during a lottery transaction, or at pre-defined time intervals, to ensure that movement of the communication device to an unauthorized area is detected during lottery activities, and not just upon login or initial access.

Thus, depending on the location determination technology being used, the decision whether to permit or prohibit a lottery activity may be made at the communication device, at the lottery platform, or at any of the components of the telecommunication network being used to transmit information between the platform and the communication device (such as at a base station, for example).

Lottery platform 20 also includes a commission determination module 26. Among other thing, commission determination module 26 determines the commissions payable to one or more retailers. The determination may be made, at least in part, based on the location of one or more communication devices 12 (as determined, for example, by location determination module 24). It should be understood that all modules and/or components illustrated within platform 20 may be separate, integrated, centralized, remote, overlapping, or in any other configuration so long as the functionality of the modules is provided.

Commission determination module 26 may determine that a retailer 30 that is closest to a particular device 12, which was used to purchase a lottery ticket, is to be credited with the sale of that ticket. Thus, that particular retailer would be entitled to any applicable commission based on that sale. It should be understood that the term "retailer" is not meant to be limiting. A retailer can be any distributor of lottery tickets (or other contest entries or other goods or services being purchased). A retailer can be an individual, a store, a government agency, a distributor, a kiosk, etc. In another embodiment, the commission determination module may be operable to determine a commission based on the location of one or more retailers within a certain distance from one or more communication devices 12, such as the particular device 12 used to purchase a ticket. For example, location determination module 24 may determine the location of a device 12 used to purchase a ticket. Commission determination module 26 may determine that two retailers 30 are within a predetermined (e.g., 5 mile) radius of the communication device 12. Commission determination module 26 may further determine that the commission for the sale of the ticket will be split between the two retailers 30.

Commission determination module 26 may use additional parameters to determine the appropriate commission. Such parameter may include, without limitation, location of one or more devices 12; location of one or more retailers 30; distances from one or more devices 12 to one or more retailers 30; pre-selected user preferences; day, date and time information; zone boundaries; prorating parameters, percentages, etc.

According to another embodiment, predetermined zones may be established. If a purchase is made using a device in a particular zone, it may be determined that all or a subset of the retailers in that zone are credited with the sale.

According to another embodiment, commission determination module 26 may prorate commissions between multiple retailers based on their respective distances to the device 12 that was used to make the purchase. According to a related example, module 26 may determine the commissions based on predetermined percentages according to which the various retailers (e.g., all of the retailers within 5 miles of the device 12) should be entitled to a commission. For example, certain stores might be entitled to greater percentages than other stores.

According to at least one embodiment, a user of a device 12 may pre-select one or more retailer to be a "home" retailer. This might be a retailer, for example, that the user frequents in person. When the device 12 is used by that particular user to purchase a lottery ticket, the home retailer is credited with the sale. This feature may be independent of, or combined with, the other parameters described herein. For example, the home retailer may be credited regardless of the location of the device 12. As an alternative example, the home store is credited together with, but at a higher percentage than, additional retailers that are all within a certain distance from the device 12.

According to another embodiment, a user of a device 12 may only be able to make a purchase using the device when the device is within a certain distance from a particular point. For example, the user might have to be within a certain distance from a billboard advertising the lottery. If a purchase is made within a certain distance from the point, a predetermined recipient is credited with the sale (and thus any commission). In this case, the advertiser might be credited with the commission, or at least a portion thereof.

According to a related aspect, users might be presented with one or more possible codes which must be entered on the communication device GUI in order to make a purchase. For example, a code may be displayed on a billboard, or on an advertisement in a store, or on an advertisement on a particular television station. If the user enters a particular code in conjunction with the purchase of the ticket, then the entity associated with the code (e.g., the advertiser, the store where the advertisement is located, or the media entity providing the code) is credited with the sale and the resulting commission.

It should be understood that the term "commission" is not limited to any particular type of commission. Commission may simply mean, in some embodiments, recognition or credit for a sale. Commissions may be financial commissions paid, for example, as a percentage of the sale. Commissions may also be other types of incentives, including other types of financial incentives, such as bonuses, which are determined based on any suitable parameters.

Figure 2:
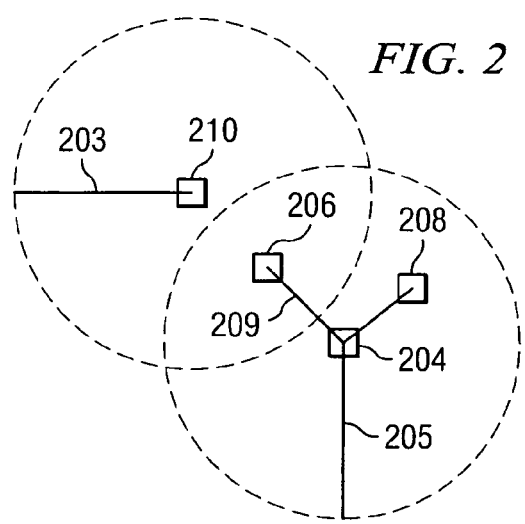
FIG. 2 illustrates a wireless lottery sales commission distribution plan according to an embodiment of the present invention.

FIG. 2 illustrates an example of the operation of the location determination module 24 in conjunction with the operation of the commission determination module 26. As shown, there are two communication devices 210 and 204, respectively. There are also two retailers 206 and 208, respectively. According to an example, a lottery ticket may be purchased using device 210. Location determination module 24 may determine that device 210 is at a particular location. Commission determination module 26 may retrieve information regarding the location of various retailers to determine that retailer 206 is the only retailer within a certain predetermined radius 203 of device 210. Thus, commission determination module 26 may determine that retailer 206 is entitled to the credit for, and any commissions resulting from, the sale of the lottery ticket which was made using device 210.

In another example illustrated by FIG. 2, a lottery ticket may be purchased using device 204. In this case, location determination module 24 determines the location of device 204. Commission determination module 26 may determine (based on stored information, for example) the locations of various retailers and may further determine that retailers 206 and 208 are the only retailers within a certain radius 205 from device 204. Commission determination module 26 may then determine that the credit and commission for the sale is to be equally divided between retailers 206 and 208.

Alternatively, it may be determined that retailer 206 is a first distance 209 from device 204 and retailer 208 is a second distance 207 from device 204. It may be further determined that second distance 207 is shorter than first distance 209. It may be consequently determined that retailer 208 is closer to device 204 than is retailer 206 and, therefore, retailer 208 is entitled to the commission.

Alternatively, it may be determined that second distance 207 is half the distance of first distance 209. It may be further determined that the commission will be divided between retailers 206 and 208, but prorated 1/3 to retailer 206 and 2/3 to retailer 208. It should be appreciated that numerous examples for determining the commission based at least partially on the retailer and user locations may be incorporated into the various embodiments as described herein.

Figure 3:
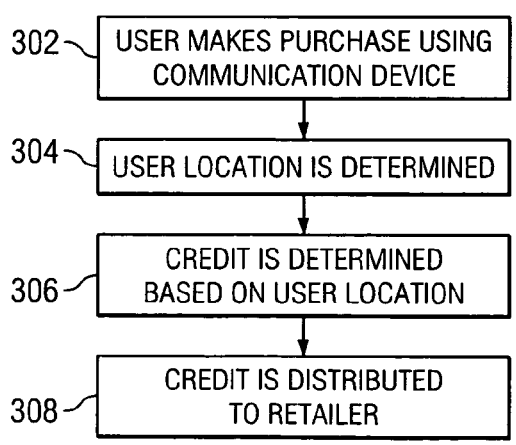
FIG. 3 illustrates a wireless lottery method according to an embodiment of the present invention.

FIG. 3 illustrates an example method for determining commissions for the sale of a lottery ticket. Although the method shows various steps in a certain order, the invention is not so limited. Steps may be added, removed, and altered, and the order of the various steps may be change.

In the illustrated example, the method begins with step 302 in which a user makes a purchase using a communication device. The purchase may be, for example, the purchase of a lottery ticket. Any of the other types of purchases described herein are contemplated.

In step 304, the location of the user is determined. This may be accomplished using any of the components and any of the techniques described herein. Preferably, the location is determined based on the location of the user's communication device at the time the purchase is made. However, the location may be determined at another time or according to other criteria.

In step 306, a credit (e.g., a sales commission) is determined based at least partially on the user location. Again, the credit may be any type of financial or non-financial credit, commission, payment, bonus or recognition. The credit may be determined based on any of the techniques and according to any of the additional parameters discussed herein.

In step 308, the credit, as determined in step 306, is distributed to one or more retailers. The distribution may be accomplished according to any suitable payment method including cash, check, money or wire transfer, credit, etc. Other distributions are envisioned such as would be applicable to a non-financial credit. The credit may also be distributed by the creation of a record corresponding to the purchase and linking the retailer to the record (e.g., by use of a retailer ID).

Although various embodiments of the invention and its advantages have been described in detail, a person skilled in the art could make various alternations, additions, and omissions without departing from the spirit and scope of the present invention as defined by the appended claims.

For example, according to a related aspect, at least certain embodiments may incorporate a messaging function. According to the messaging function, a retailer or the lottery platform may send messages to one or more of the users. The messages may be, for example, alerts, advertisements, promotions, confirmations, etc. Messages might be predetermined based on distance or proximity of the user to one more other elements of system 10 (such as a retailer). As an example, a retailer that is credited with the commission for the sale of a lottery ticket made using a device 12 may generate a message to the user of device 12. The message might thank the user for making the purchase and invite the user to the retailer's location for a free drink. The message may also include directions to the merchant's store. According to certain related aspects, merchants that sell the wireless lottery tickets may, within a certain range, send messages (e.g., advertisements) back to the user who is purchasing the ticket. For example, if a user purchases a ticket, the four agents within 1/4 mile of the purchaser may be allowed to send a message to the user, which is viewable on the user's device.

According to another aspect, the system may be configured to determine when a user enters a particular property (e.g., the parking lot of a particular convenience store). The system may permit the user to purchase a ticket remotely (e.g., from the car) once the user is located within certain boundaries or within a certain range of some predetermined point.

According to another aspect, the lottery services described herein may be provided as an add-on, or ancillary service, in conjunction with a basic telecommunications service.

The invention claimed is:

1. A method for determining credit for a sale made at a time using an electronic communication device, the method comprising:
    determining, by at least one processor, a location of the electronic communication device at the time of the sale;
    determining by the at least one processor, for each of a plurality of retailers, a distance between (a) the location of the electronic communication device at the time of the sale and (b) a location of the respective retailer; and
    determining, by the at least one processor, the credit based at least partially on the determined distance between the location of the electronic communication device at the time of the sale and the location of each respective retailer, wherein the step of determining the credit comprises:
        determining, based on the determined distance between (a) the location of the electronic communication device at the time of the sale and (b) the location of each respective retailer, one or more of the plurality of retailers that are within a predetermined range of the location of the electronic communication device at the time of the sale, and
        providing the credit to the one or more retailers,
    wherein the credit is divided equally among the one or more retailers.

2. The method of claim 1, wherein at least a portion of the credit is provided to a predetermined retailer regardless of a distance between the predetermined retailer and the location of the electronic communication device at the time of the sale.

3. The method of claim 1, further comprising receiving purchase information from the electronic communication device.

4. The method of claim 1, wherein the purchase is only allowed if the electronic communication device is within a predetermined zone.

5. The method of claim 1, wherein the purchase is only allowed if the location of the electronic communication device is within a certain predetermined distance from a predetermined second location.

6. The method of claim 1, wherein the step of determining the credit comprises defining at least one zone and determining at least one retailer within the zone, and wherein the location is within the zone.

7. The method of claim 1, further comprising sending a message to the user of the electronic communication device.

8. A method for determining credit for a sale made at a time using an electronic communication device, the method comprising:

determining, by at least one processor, a location of the electronic communication device at the time of the sale;

determining by the at least one processor, for each of a plurality of retailers, a distance between (a) the location of the electronic communication device at the time of the sale and (b) a location of the respective retailer; and determining, by the at least one processor, the credit based at least partially on the determined distance between the location of the electronic communication device at the time of the sale and the location of each respective retailer, wherein the step of determining the credit comprises:

determining, based on the determined distance between (a) the location of the electronic communication device at the time of the sale and (b) the location of each respective retailer, one or more of the plurality of retailers that are within a predetermined range of the location of the electronic communication device at the time of the sale, and providing the credit to the one or more retailers, wherein the credit is divided among the one or more retailers according to predetermined percentages based on the determined distance between (a) the location of the electronic communication device at the time of the sale and (b) the location of each of the one or more retailers.

9. The method of claim 8, wherein at least a portion of the credit is provided to a predetermined retailer regardless of a distance between the predetermined retailer and the location of the electronic communication device at the time of the sale.

10. The method of claim 9, further comprising receiving purchase information from the electronic communication device.

11. The method of claim 8, wherein the purchase is only allowed if the electronic communication device is within a predetermined zone.

12. The method of claim 8, wherein the purchase is only allowed if the location of the electronic communication device is within a certain predetermined distance from a predetermined second location.

13. The method of claim 8, wherein the step of determining the credit comprises defining at least one zone and determining at least one retailer within the zone, and wherein the location is within the zone.

14. The method of claim 8, further comprising sending a message to the user of the electronic communication device.

15. A method for determining credit for a sale made at a time using an electronic communication device, the method comprising:

determining, by at least one processor, a location of the electronic communication device at the time of the sale;

determining by the at least one processor, for each of a plurality of retailers, a distance between (a) the location of the electronic communication device at the time of the sale and (b) a location of the respective retailer; and determining, by the at least one processor, the credit based at least partially on the determined distance between the location of the electronic communication device at the time of the sale and the location of each respective retailer, wherein the step of determining the credit comprises:

determining, based on the determined distance between (a) the location of the electronic communication device at the time of the sale and (b) the location of each respective retailer, one or more of the plurality of retailers that are within a predetermined range of the location of the electronic communication device at the time of the sale, and providing the credit to the one or more retailers, wherein the credit is prorated among the one or more retailers based on the determined distance between (a) the location of the electronic communication device at the time of the sale and (b) the location of each of the one or more retailers.

16. The method of claim 15, wherein the prorating is based on the relative distance from each of the one or more retailers to the location of the electronic communication device at the time of the sale.

17. The method of claim 15, wherein at least a portion of the credit is provided to a predetermined retailer regardless of a distance between the predetermined retailer and the location of the electronic communication device at the time of the sale.

18. The method of claim 15, further comprising receiving purchase information from the electronic communication device.

19. The method of claim 15, wherein the purchase is only allowed if the electronic communication device is within a predetermined zone.

20. The method of claim 15, wherein the purchase is only allowed if the location of the electronic communication device is within a certain predetermined distance from a predetermined second location.

21. The method of claim 15, wherein the step of determining the credit comprises defining at least one zone and determining at least one retailer within the zone, and wherein the location is within the zone.

22. The method of claim 15, further comprising sending a message to the user of the electronic communication device.

23. The method of claim 3, wherein the purchase information comprises a code.

24. The method of claim 23, wherein the step of determining the credit is performed based at least partially on the code.

25. The method of claim 24, wherein the code is associated with an entity and at least a portion of the credit is provided to the entity.

26. The method of claim 24, wherein the code is associated with an entity and at least a portion of the credit is provided to the entity.

27. The method of claim 25, wherein the entity is an advertiser.

28. The method of claim 25, wherein the entity is a media provider.

29. The method of claim 28, wherein the code is provided on media distributed by the media provider.

30. The method of claim 5, wherein the predetermined second location corresponds to the location of an advertisement.

31. The method of claim 7 wherein the message is a promotion.

32. The method of claim 7, wherein the message is a confirmation of the purchase.

33. The method of claim 20, wherein the purchase information comprises a code.

34. The method of claim 33, wherein the step of determining the credit is performed based at least partially on the code.

35. The method of claim 34, wherein the code is associated with an entity and at least a portion of the credit is provided to the entity.

36. The method of claim 35, wherein the entity is an advertiser.

37. The method of claim 35, wherein the entity is a media provider.

38. The method of claim 36, wherein the code is provided on media distributed by the media provider.

39. The method of claim 12, wherein the predetermined second location corresponds to the location of an advertisement.

40. The method of claim 14, wherein the message is a promotion.

41. The method of claim 14, wherein the message is a confirmation of the purchase.

42. The method of claim 18, wherein the purchase information comprises a code.

43. The method of claim 42, wherein the step of determining the credit is performed based at least partially on the code.

44. The method of claim 26, wherein the entity is an advertiser.

45. The method of claim 26, wherein the entity is a media provider.

46. The method of claim 45, wherein the code is provided on media distributed by the media provider.

47. The method of claim 20, wherein the predetermined second location corresponds to the location of an advertisement.

48. The method of claim 22, wherein the message is a promotion.

49. The method of claim 22, wherein the message is a confirmation of the purchase.

* * * * *